US012762650B2

(12) United States Patent
Liang

(10) Patent No.: US 12,762,650 B2
(45) Date of Patent: Oct. 13, 2026

(54) SYSTEMS AND METHODS FOR DEFOGGING IMAGES AND VIDEO

(71) Applicant: Advanced Micro Devices, Inc., Santa Clara, CA (US)

(72) Inventor: Xiaodong Liang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 535 days.

(21) Appl. No.: 17/879,473

(22) Filed: Aug. 2, 2022

(65) Prior Publication Data

US 2024/0046418 A1 Feb. 8, 2024

(51) Int. Cl.
*G06T 5/50* (2006.01)
*G06T 5/20* (2006.01)
(Continued)

(52) U.S. Cl.
CPC .................. *G06T 5/50* (2013.01); *G06T 5/20* (2013.01); *G06T 5/70* (2024.01); *H04N 9/646* (2013.01);
(Continued)

(58) Field of Classification Search
CPC ................... G06T 5/00–94; G06T 7/90; G06T 2207/10024; G06T 2207/30232;
(Continued)

(56) References Cited

U.S. PATENT DOCUMENTS 10,269,129 B2 * 4/2019 Liu ........................... G06T 1/60
2016/0155218 A1 * 6/2016 Svensson .................. G06T 5/40 382/165
(Continued)

FOREIGN PATENT DOCUMENTS

CN 112991201 A * 6/2021
CN 113191971 A * 7/2021 ............ G06N 3/045

OTHER PUBLICATIONS

Yoon et al., Adaptive defogging with color correction in the HSV color space for consumer surveillance system (Year: 2012).*
(Continued)

*Primary Examiner* — Oneal R Mistry
(74) *Attorney, Agent, or Firm* — Kowert, Hood, Munyon, Rankin & Goetzel, P.C.; Rory D. Rankin

(57) ABSTRACT

Systems, apparatuses, and methods for implementing defogging techniques for images and video are disclosed. A defogging engine generates a defog filter result from a grayscale format version of an input image. An estimation engine generates an enhancement strength variable from a hue-saturation-value (HSV) format version of the input image. An enhancement engine receives both the defog filter result from the defogging engine and the enhancement strength variable from the estimation engine. The enhancement engine also receives the original red-green-blue (RGB) color space format version of the input image. The enhancement engine generates an enhanced version of the input image from the original RGB format version based on the defog filter result and the enhancement strength variable. The enhanced version of the input image mitigates fog, haze, mist or other environmental impediments that obscured the original input image.

20 Claims, 12 Drawing Sheets

(51) Int. Cl.
*G06T 5/70* (2024.01)
*H04N 9/64* (2023.01)
*H04N 9/67* (2023.01)

(52) U.S. Cl.
CPC ..... *H04N 9/67* (2013.01); *G06T 2207/10016* (2013.01); *G06T 2207/10024* (2013.01)

(58) Field of Classification Search
CPC ..................... G06T 2207/30181–30192; G06T 2207/20212–20224; H04N 9/646; H04N 9/67
See application file for complete search history.

(56) References Cited

U.S. PATENT DOCUMENTS

2019/0166292 A1 5/2019 Grilikhes
2022/0076168 A1* 3/2022 Zhang .................. G06F 18/214

OTHER PUBLICATIONS

Yan et al., Nighttime Defogging Using High-Low Frequency Decomposition and Grayscale-Color Networks (Year: 2020).*
Pandey (NPL "A Fast and Effective vision enhancement method for single foggy image" Engineering Science and Techology, 2021, 1478-1489) (Year: 2021).*
Pandey (NPL "A Fast and Effective vision enhancement method for single foggy image" Engineering Science and Techology, 2021, 1478-1489).*
Keyu et al (CN 113191971 A, hereafter referred to as Keyu, Google Translation provided in rejection.).*
Anan et al., "Image Defogging Framework Using Segmentation and the Dark Channel Prior", Entropy 2021, Feb. 26, 2021, 21 pages, vol. 23, Issue 3, https://www.mdpi.com/1099-4300/23/3/285. [Retrieved Mar. 8, 2022].
Cui et al., "An improved dark channel defogging algorithm based on the HSI colour space", IET Image Process, Dec. 15, 2021, pp. 823-838, vol. 16, Issue 3, https://ietresearch.onlinelibrary.wiley.com/doi/epdf/10.1049/ipr2.12389. [Retrieved Mar. 8, 2022].
He et al., "Guided Image Filtering", 11th European Conference on Computer Vision (ECCV 2010), Lecture Notes in Computer Science, 2010, 14 pages, vol. 6311, http://kaiminghe.com/publications/eccv10guidedfilter.pdf. [Retrieved Mar. 1, 2022].
He et al., "Single Image Haze Removal Using Dark Channel Prior", 2009 IEEE Conference on Computer Vision and Pattern Recognition, Jun. 2009, 8 pages, http://kaiminghe.com/publications/cvpr09.pdf. [Retrieved Mar. 8, 2022].
Li et al., "An Improved Defogging Algorithm Based on Dark Color Theory Combined with Self-Adaptive Threshold Mechanism", Journal of Control Science and Engineering, Aug. 1, 2018, 10 pages, vol. 2018, Article ID 3975373, https://doi.org/10.1155/2018/3975373. [Retrieved Mar. 8, 2022].
International Search Report and Written Opinion in International Application No. PCT/US2023/028118, dated Oct. 18, 23, 10 pages.

* cited by examiner

SYSTEMS AND METHODS FOR DEFOGGING IMAGES AND VIDEO

BACKGROUND

Description of the Related Art

Images captured in adverse weather in the presence of fog or haze are degraded in terms of visibility, contrast, and color. The resultant images are degraded due to the presence of particles in the air which obscure the environment being captured by the camera. Often the images taken in these conditions cannot be used by the end-user computer or vision application such as surveillance, object detection, object tracking, navigation, and other applications.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
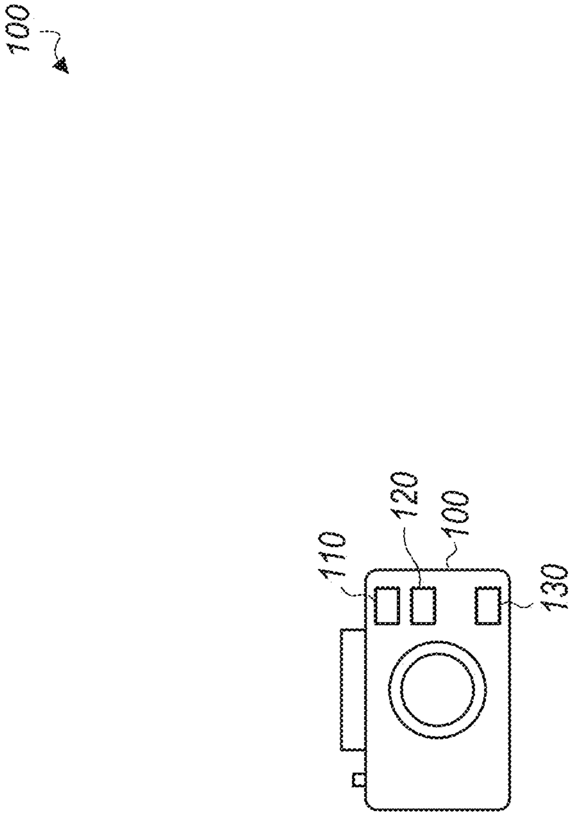
FIG. 1 is a block diagram of one implementation of a camera.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing defogging techniques for images and video are disclosed herein. In one implementation, a defogging engine generates a defog filter result from a grayscale format version of an input image or video frame. The image or frame can be received in the red-green-blue (RGB) color space and converted to the grayscale format prior to processing by the defogging engine. An estimation engine generates an enhancement strength variable from a hue-saturation-value (HSV) format version of the input image. An enhancement engine receives both the defog filter result from the defogging engine and the enhancement strength variable from the estimation engine. The enhancement engine also receives the original RGB format version of the input image. The enhancement engine generates an enhanced version of the input image from the original RGB format version based on the defog filter result and the enhancement strength variable. The enhanced version of the input image mitigates fog, haze, mist or other environmental impediments that obscured the original input image. It is noted that the defogging engine, the estimation engine, and the enhancement engine can be implemented using any suitable combination of circuitry (e.g., application specific integrated circuit (ASIC), field programmable gate array (FPGA)) and program instructions executable by one or more processing units. In some cases, one or more of the defogging engine, the estimation engine, and the enhancement engine are implemented entirely with circuitry configured to perform the functions described herein. In these cases, the defogging engine, the estimation engine, and/or the enhancement engine can be referred to as the defogging circuit, the estimation circuit, and the enhancement circuit, respectively. In other cases, one or more of the defogging engine, the estimation engine, and the enhancement engine are implemented by a combination of circuitry and program instructions executed by processing unit(s). In further cases, one or more of the defogging engine, the estimation engine, and the enhancement engine are implemented entirely by one or more processing units executing program instructions so as to realize the functions and/or algorithms described herein.

Referring now to FIG. 1, a diagram of one implementation of a camera 100 is shown. In one implementation, camera 100 includes at least defogging engine 110, estimation engine 120, and enhancement engine 130. In various implementations, the functionality of defogging engine 110, estimation engine 120, and enhancement engine 130 can be distributed into other arrangements of components or the functionality can be combined into a single defogging module. In various implementations, defogging engine 110 generates a defog filter result from a first format version of an image captured by camera 100. In one or more implementations, estimation engine 120 generates an enhancement strength variable from a second format version of the image. Additionally, in various implementations, enhancement engine 130 generates an enhanced version of the image from a third format version of the image based on the defog filter result and the enhancement strength variable. More details on these methods and mechanisms will be provided throughout the remainder of the disclosure.

It is noted that any type of system or device can implement the techniques described herein, including an integrated circuit (IC), system on chip (SoC), processing unit, mobile device, smartphone, gaming device, Internet of Things (IoT) device, tablet, computer, camera, automobile, wearable device, and other types of computing devices and systems. It is also noted that defogging engine 110, estimation engine 120, and/or enhancement engine 130 can be included on a separate apparatus or system from the camera which captures the image(s) being defogged. In these cases, the image(s), or portions thereof, can be sent from the camera to the apparatus or system employing defogging engine 110, estimation engine 120, and/or enhancement engine 130. Also, while the descriptions herein often refer to images, it should be understood that these descriptions also apply to video frames captured by a video camera or other device capable of capturing a sequence of images.

Figure 2:
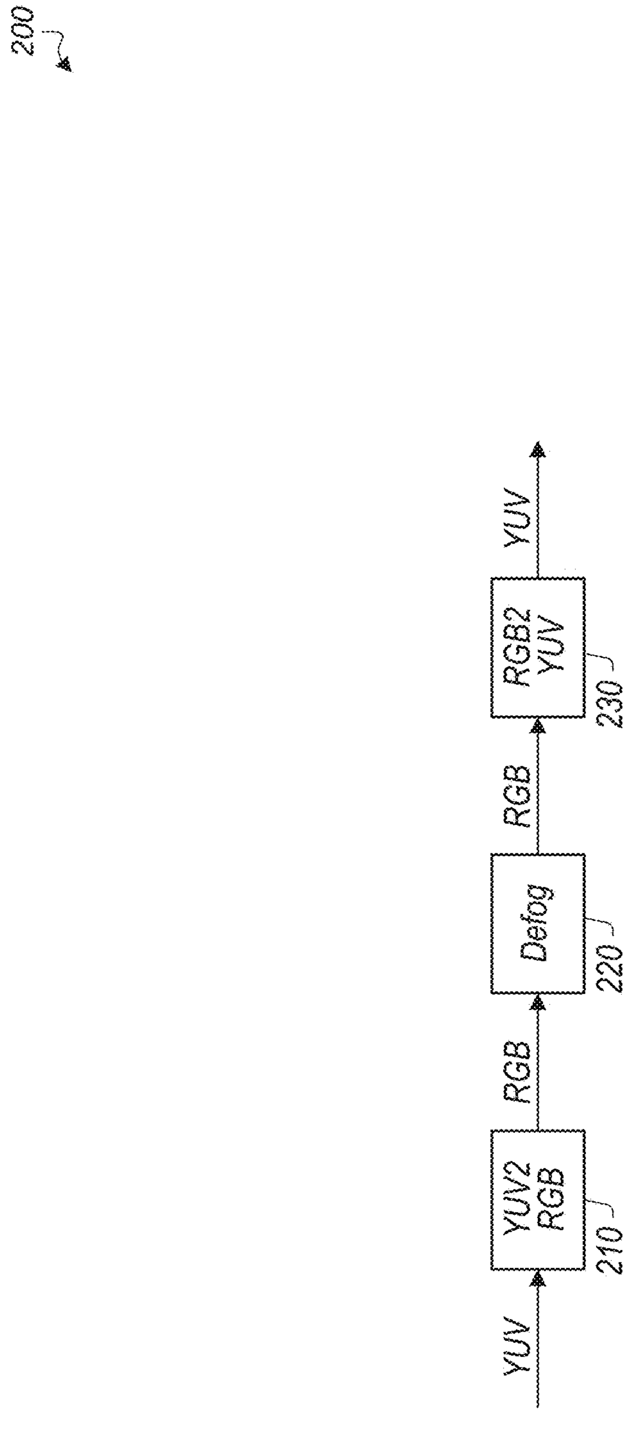
FIG. 2 is a block diagram of one implementation of a video system.

Turning now to FIG. 2, a block diagram of one implementation of a video system 200 is shown. In one implementation, video system 200 is a video surveillance system. In other implementations, video system 200 is any of various other types of video systems. Video system 200 receives input pixel data for processing. The input pixel data can be from an image or a video frame.

In one implementation, the input pixel data is received by system 200 in the YUV format. The YUV format defines a color space in terms of one luminance component (Y) and two chrominance components U and V. Conversion unit 210 converts the input pixel data from the YUV to the red, green, blue (RGB) format. Next, the pixel data in the RGB format is provided to defogging unit 220 where a defogging algorithm is applied. It is noted that defogging unit 220 can also be referred to as defogging module 220 or defog module 220. In one implementation, defogging unit 220 combines defogging and adaptive color correction, which can be applied to remove fog, like smog, mist, dust, and haze. The defogged pixel data is output to conversion unit 230 which converts the defogged pixel data back to the YUV format. The output of conversion unit 230 is the defogged pixel data in the YUV format.

Figure 3:
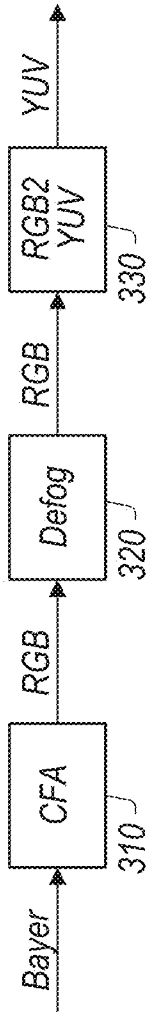
FIG. 3 is a block diagram of another implementation of a camera system.

Referring now to FIG. 3, a block diagram of one implementation of a camera system 300 is shown. In one implementation, camera system 300 receives input pixel data in the Bayer format. In other implementation, camera system 300 receives input pixel data in any of various other formats. Color filter array (CFA) 310 converts the input pixel data from the Bayer format to the RGB color space. Next, the pixel data in the RGB color space is provided to defogging unit 320 where any of the defogging algorithms presented herein are applied. The defogged pixel data is coupled to conversion unit 330 where the defogged pixel data is converted back to the YUV format.

Figure 4:
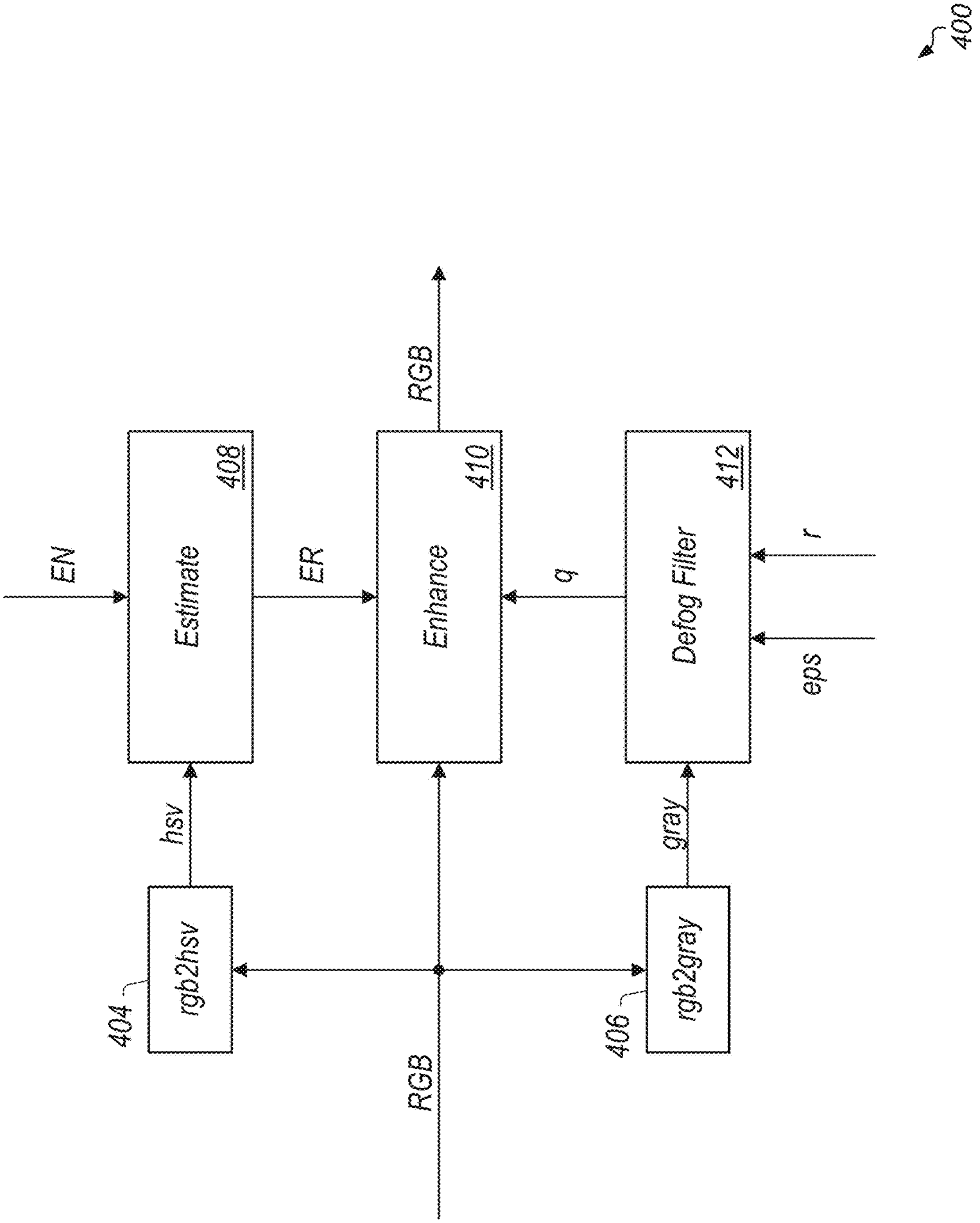
FIG. 4 is a block diagram of one implementation of a defog module.

Turning now to FIG. 4, a block diagram of one implementation of a defog module 400 is shown. In one implementation, defog module 400 receives input pixel data in the RGB format. However, it is noted that in other implementations, the input pixel data can be encoded in other formats when received by defog module 400. In these implementations, appropriate types of conversion units can be used to convert the input pixel data to the HSV and grayscale formats. It is noted that defog module 400 can also be referred to as defogging module 400 or defogging/defog unit 400.

In one implementation, the input pixel data is converted to the HSV color space by conversion unit 404 and provided to estimate unit 408. Also, the input pixel data is converted to grayscale by conversion unit 406 and provided to defog filter 412. Estimate unit 408 receives the signal "EN" which is an auto-estimate enable signal in one implementation. Estimate unit 408 generates an estimate of the atmospheric fog intensity based on the input pixel data in the HSV color space. It is noted that estimate unit 408 can also be referred to as estimation engine 408. Based on the estimate of the atmospheric fog intensity, estimate unit 408 provides an enhancement strength signal (or "ER") to enhancement unit 410.

In one implementation, defog filter 412 receives the grayscale pixel data, a regularization parameter (or "eps"), and a local window radius (or "r"). Defog filter 412 generates the defog filter result which is shown as signal "q" in FIG. 4. It is noted that defog filter 412 can also be referred to as defog engine 412 or defogging engine 412. In one implementation, enhancement unit 410 generates the enhanced pixel data in the RGB format from the input pixel data based on the enhancement strength signal and the defog filter result. In one implementation, enhancement unit 410 combines defogging and adaptive color correction which can be applied to remove fog, smog, mist, dust, smoke, haze, and the like. In one implementation, enhancement unit 410 employs adaptive defogging by strength controlling. It is noted that enhancement unit 410 can also be referred to as enhancement engine 410.

Figure 5:
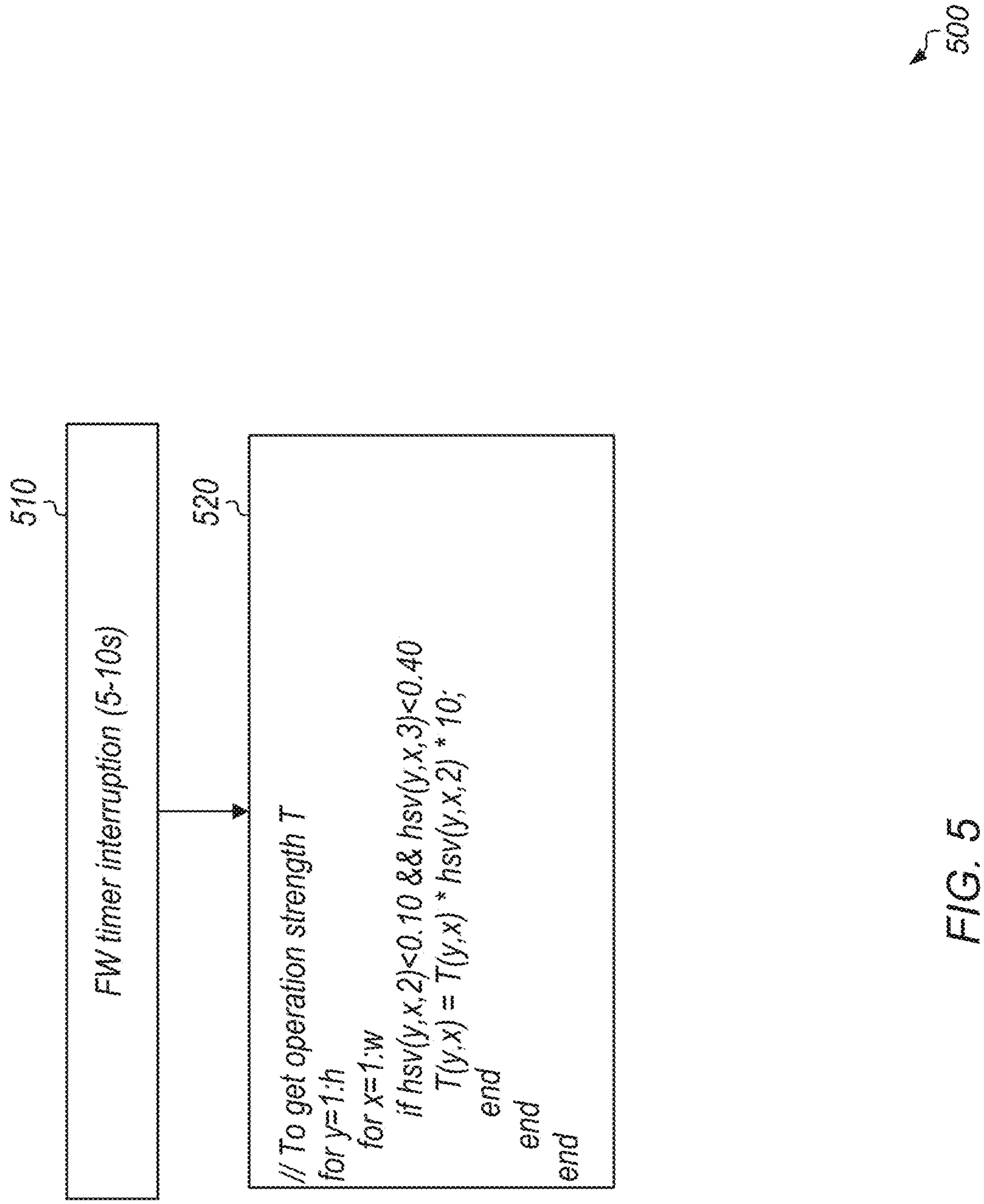
FIG. 5 is a diagram of one implementation of a technique for generating operation strength.

Referring now to FIG. 5, a diagram 500 of one implementation of a technique for generating operation strength is shown. In one implementation, the firmware (FW) executing on a defogging system or apparatus includes a timer to generate an interrupt on some interval as represented by block 510. In one implementation, the interval is on the order of 5 to 10 seconds. In other implementations, other intervals can be employed. When the interrupt is triggered, a routine to determine the operation strength "T" is performed. The steps of capturing the operating strength T in accordance with one implementation are shown in box 520.

In one implementation, a nested for loop is performed for the Y dimension from 1 to h, where "h" is the height of the window, and in the x dimension from 1 to w, where "w" is the width of the window. Within the nested for loop, the conditional statement "if hsv(y,x,2)<0.10 && hsv(y,x,3)<0.40" is evaluated for each pixel. If the conditional statement is true, then the value of T(y,x) is set equal to T(y,x) multiplied by hsv(y,x,2) multiplied by 10. For the routine in box 520, the array T(y,x) represents the operation strength for the image window being evaluated.

Figure 6:
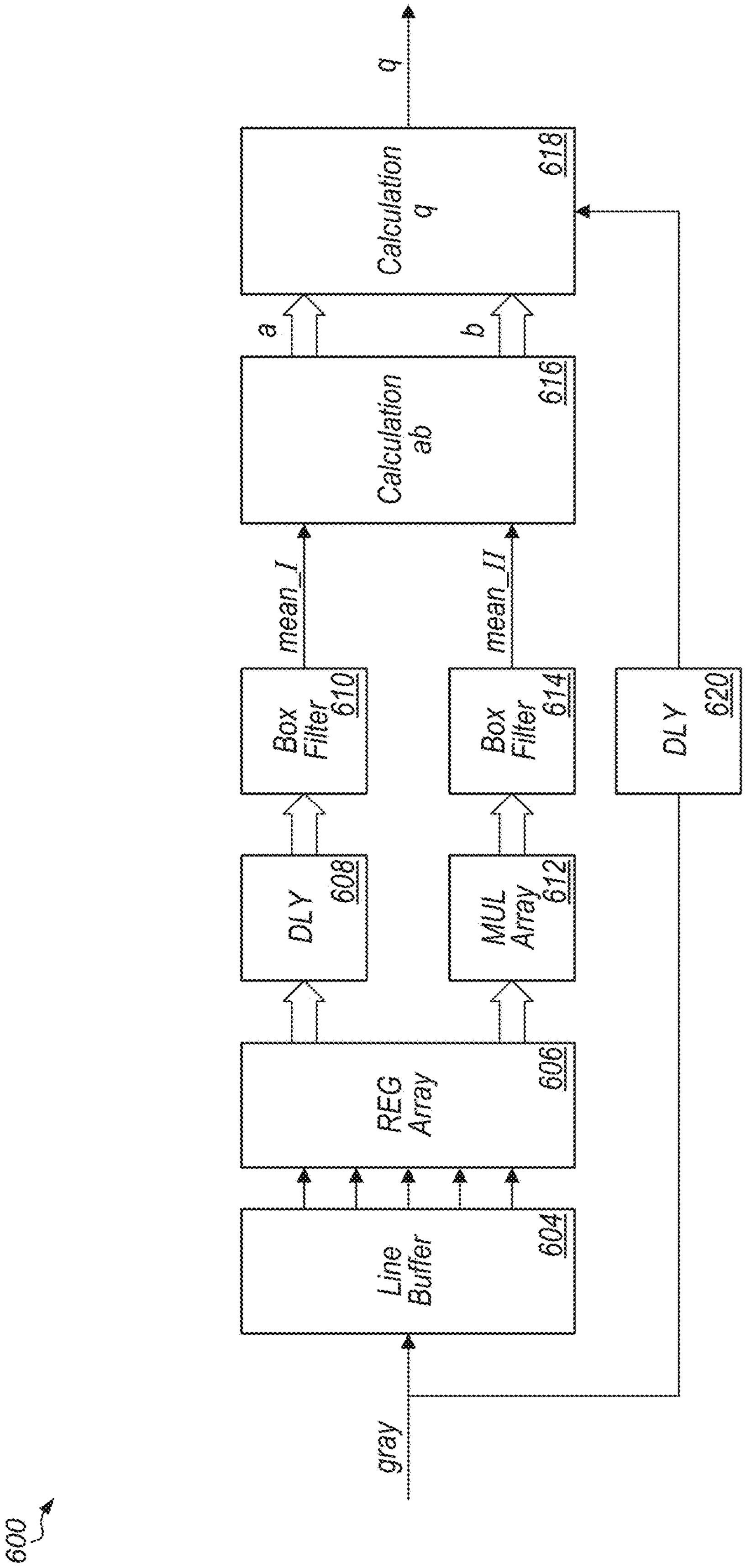
FIG. 6 is a block diagram of one implementation of a defog filter.

Turning now to FIG. 6, a block diagram of one implementation of a defog filter 600 is shown. In one implementation, defog filter 600 receives input pixel data encoded in a grayscale format. In one implementation, the input pixel data encoded in a RGB color format is converted to the grayscale format using a colorimetric conversion to grayscale. The received pixel data is stored in line buffer(s) 604 and coupled to delay unit 620. From line buffer 604, the pixel data is coupled to register ("REG") array 606 and from register array 606 to delay unit 608 and multiplier ("MUL") array 612. Delay ("DLY") unit 608 provides pixels to box filter 610, and multiplier array 612 provides pixels to box filter 614. Box filter 610 is used to calculate the first mean (or "mean_I") of the pixel data and box filter 614 is used to calculate the second mean (or "mean_II") of the pixel data. As used herein, the term "box filter" is defined as a convolution filter which filters an image sample with a filter kernel. The type of filter kernel used to perform the convolution of the image sample can vary from box filter to box filter.

The first mean and the second mean are provided to calculation unit 616, which calculates the "a" and "b" variables for the pixel data. It is noted that the "a" and "b" variables may also be referred to as "a" and "b" coefficients, and the "a" and "b" coefficients can be in vector or scalar form depending on the specific implementation. Formulas for calculating the "a" and "b" variables are shown in boxes 706 and 708, respectively, of FIG. 7. The "a" and "b" variables are provided to calculation unit 618, and the original grayscale pixel values that were delayed by delay unit 620 are also provided to calculation unit 618. Calculation unit 618 calculates the "q" variable for the pixel data, with the "q" variable being the output of defog filter 600. A formula for calculating the "q" variable is shown in box 710 of FIG. 7.

Figure 7:
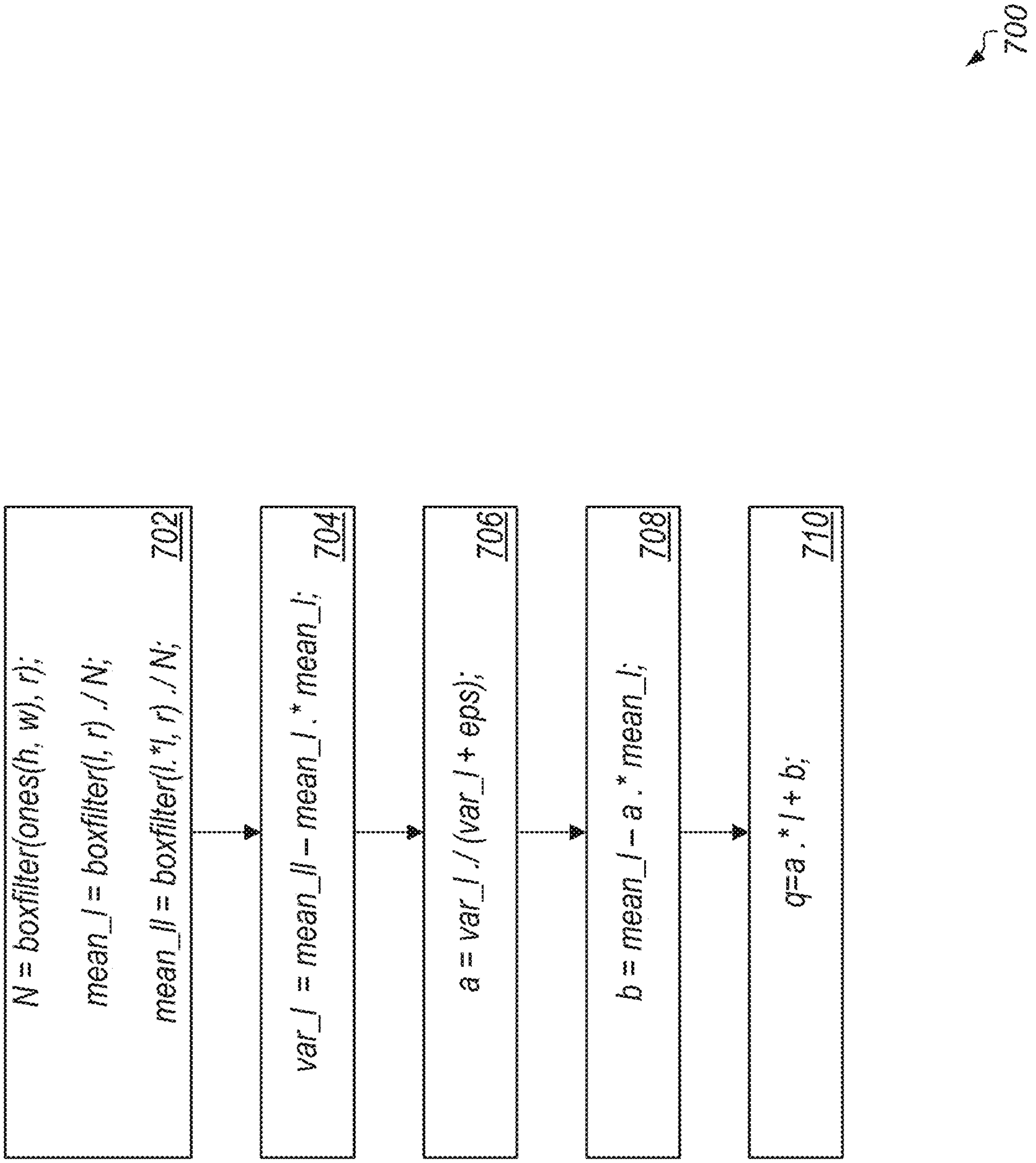
FIG. 7 is a diagram of one implementation of a set of defogging engine calculations.

Referring now to FIG. 7, a diagram 700 of one implementation of a set of defogging engine calculations is shown. Box 702 includes the calculations of the matrix N which is computed by applying a box filter to a size of the input image equal to the height "h" and width "w" of the pixel data and the local window radius "r". As shown in box 702, the first mean (or "mean_I") is generated by applying a box filter to the input image over the local window radius "r" and then dividing the box filter output by the matrix N. The second mean (or "mean_II") is generated by applying a box filter to the cross product of the image over the local window radius "r" and then dividing the box filter output by the matrix N.

As shown in box 704, the variance "var_I" of the image pixel data is calculated as the difference between the second mean and the dot product of the first mean with the first mean. Box 706 lists the formula for calculating the "a" variable as the variance "var_I" divided by the sum of the variance "var_I" and the regularization parameter "eps". In box 708, the value of the "b" variable is calculated as the difference between the first mean "mean_I" and the product of the "a" variable and the first mean "mean_I". In box 710, the value of "q" is calculated as the sum of the "b" variable and the product of the "a" variable and the input image (or "I").

Figure 8:
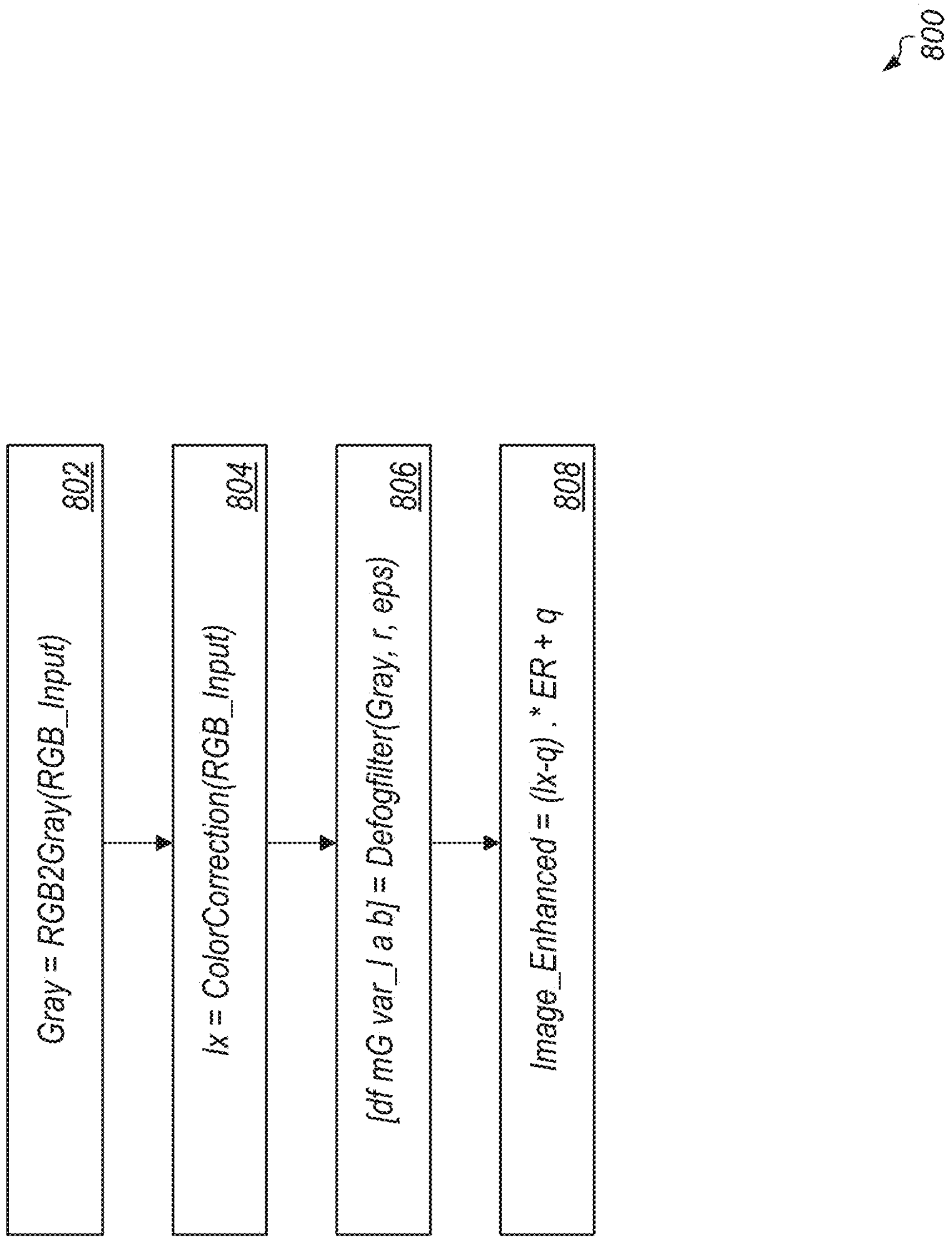
FIG. 8 is a diagram of one implementation of a process for performing enhancement unit calculations.

Turning now to FIG. 8, a diagram 800 of one implementation of a process for performing enhancement unit calculations is shown. At the beginning of the process, the grayscale format version of the input image is calculated as shown in box 802. It is assumed for the purposes of this discussion that the input image is originally received in a RGB color space format. However, in other implementations, the input image can be received in other formats and other color space conversions can be performed for these implementations. Additionally, as shown in box 804, a color correction version of the image is generated. The color correction version of the image is referred to as "Ix".

Next, as shown in box 806, the defog filter (e.g., defog filter 412 of FIG. 4) generates a defog filter result (or "df"), first and second means, a variance result, an "a" variable, a "b" variable, and a "q" variable from the "a" and "b" variables. The defog filter generates these variables based on the grayscale format version of the image, the local window radius "r", and the regularization parameter "eps". Then, as shown in box 808, an enhancement unit (e.g., enhancement unit 410) generates an enhanced image using the formula "(Ix-q)·*ER+q", where ER is the enhancement strength variable. It is noted that the calculations illustrated in boxes 802-808 can be implementing using any suitable combination of hardware (e.g., circuitry) and/or software (e.g., executable program instructions).

Figure 9:
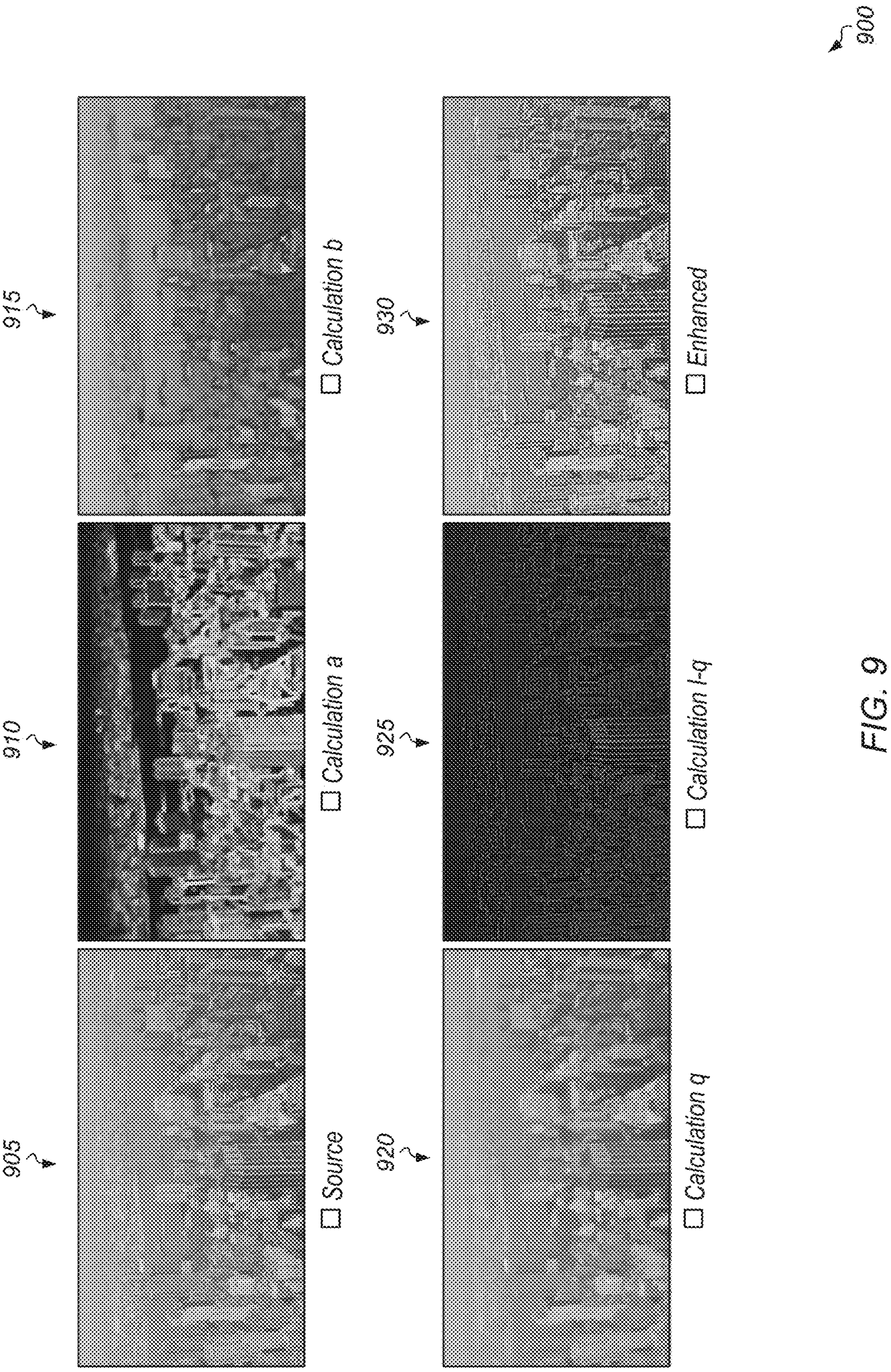
FIG. 9 includes images that are produced as part of a defogging routine in accordance with one implementation.

Referring now to FIG. 9, images that are produced as part of a defogging routine 900 in accordance with one implementation are shown. Source image 905 is shown on the top left of FIG. 9, with source image 905 showing an urban environment enveloped in a smog-like haze. The calculation of the "a" image 910 from the source image 905 is shown to the right of source image 905. In one implementation, the "a" image 910 is calculated according to the formula in block 706 (of FIG. 7). Next, the "b" image 915 is generated according to the formula shown in block 708. Then, the "q" image 920 is generated according to the formula shown in block 710. Then, the difference between the original image and q, or "I-q" image 925 is calculated. Finally, the enhanced image 930 is calculated. In one implementation, the enhanced image 930 is computed according to the formula in box 808 (of FIG. 8).

Figure 10:
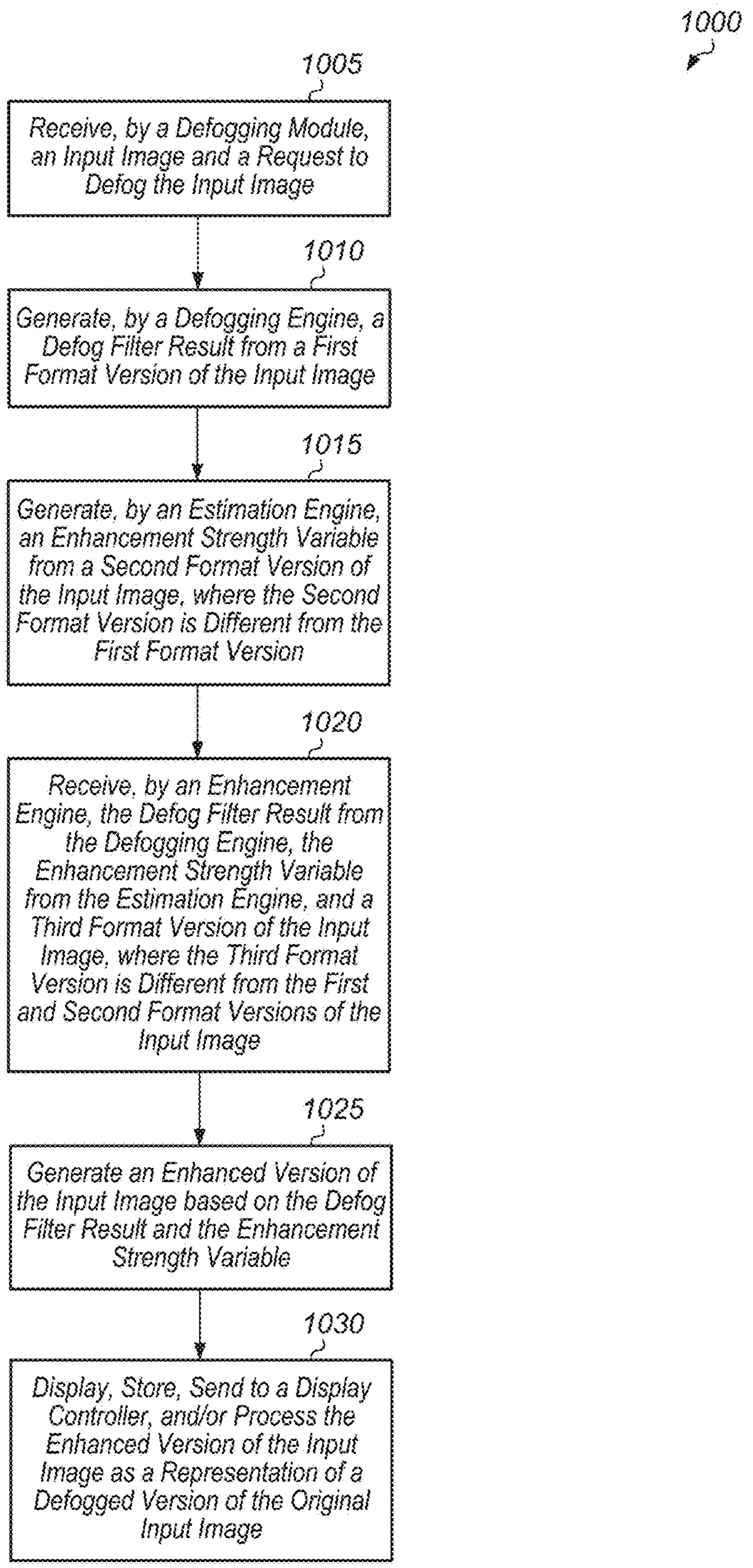
FIG. 10 is a generalized flow diagram illustrating one implementation of a method for generating a defogged version of an input image.
Figure 11:
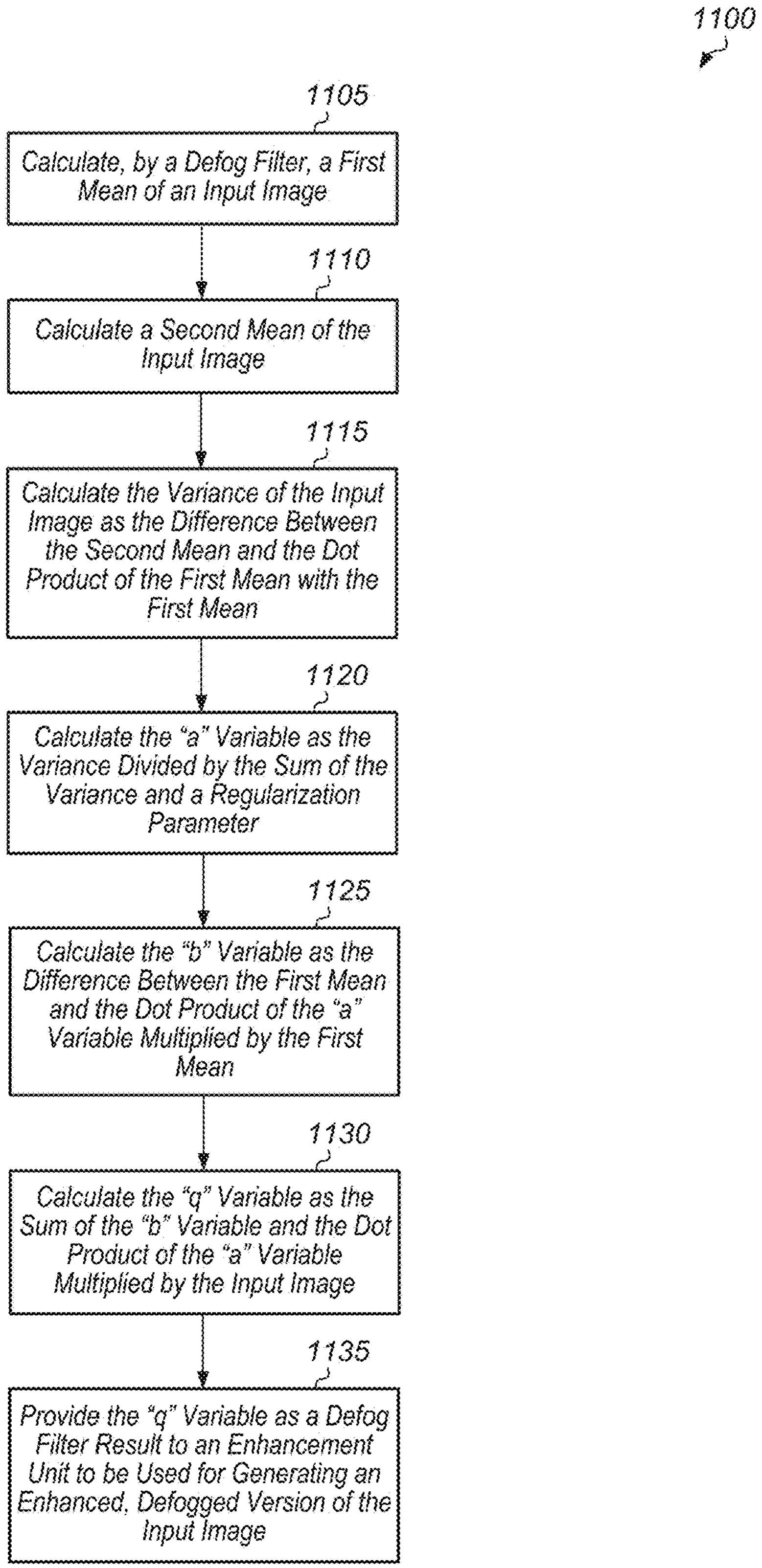
FIG. 11 is a generalized flow diagram illustrating one implementation of a method for generating a defog filter result.
Figure 12:
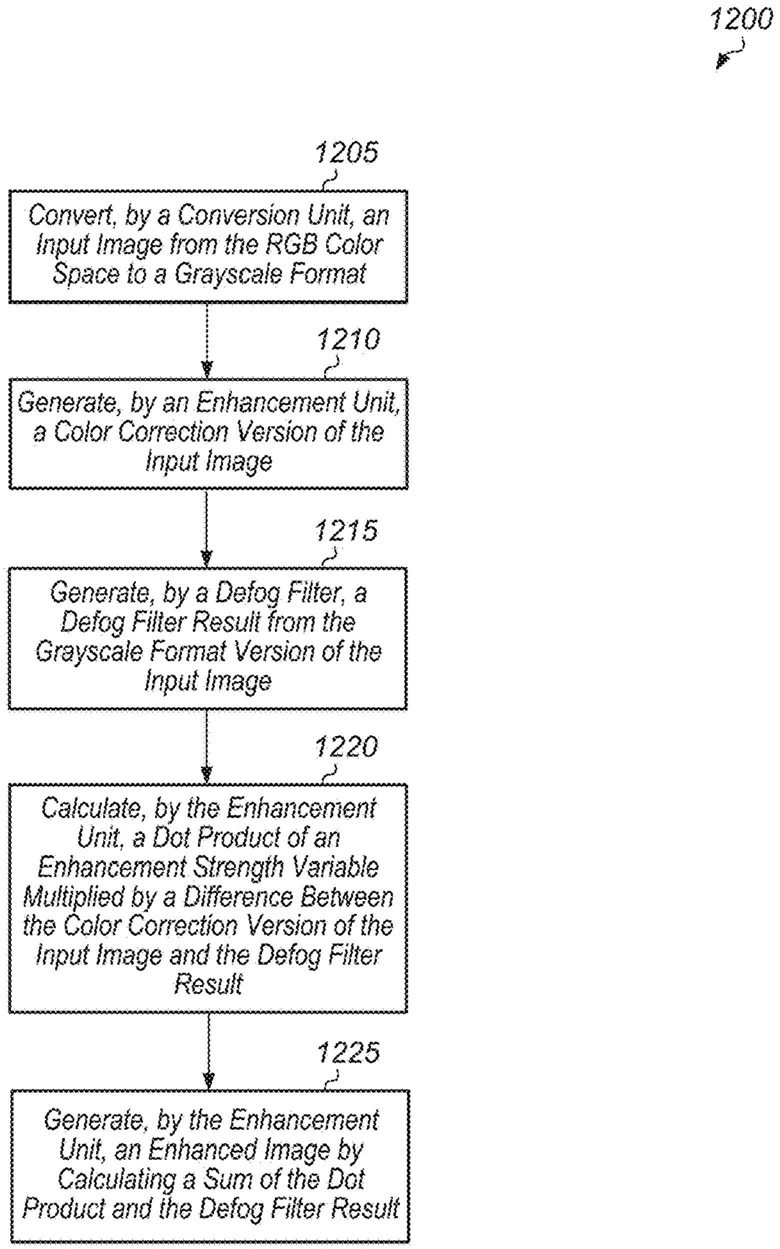
FIG. 12 is a generalized flow diagram illustrating one implementation of a method for generating an enhanced, defogged version of an input image.

Turning now to FIG. 10, one implementation of a method 1000 for generating a defogged version of an input image shown. For purposes of discussion, the steps in this implementation and those of FIG. 11-12 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1000 (and methods 1100-1200 of FIG. 11-12).

A defogging module receives an input image and a request to defog the input image (block 1005). In one implementation, the input image is received in the red-green-blue (RGB) color space. In other words, in this implementation, the input image is encoded in the RGB color space format. In other implementations, the input image received by the defogging module is encoded in other color space formats. In response to receiving the input image and the defog request, a defogging engine generates a defog filter result from a first format version of the input image (block 1010). In one implementation, the first format is a grayscale format version of the input image. In this implementation, the input image is converted to the grayscale format from the format in which it was originally received.

Also, an estimation engine generates an enhancement strength variable from a second format version of the input image, where the second format version is different from the first format version (block 1015). In one implementation, the second format version is a hue-saturation-value (HSV) format version of the input image. In other implementations, the second format version is any of various other color space format versions of the input image. Additionally, an enhancement engine receives the defog filter result from the defogging engine, the enhancement strength variable from the estimation engine, and a third format version of the input image, where the third format version is different from the first and second format versions of the input image (block 1020). In one implementation, the third format version is a RGB color space version of the input image. In other implementations, the third format version is any of various other color space format versions of the input image.

It is noted that the defogging engine, the estimation engine, and the enhancement engine can be implemented using any suitable combination of circuitry (e.g., application specific integrated circuit (ASIC), field programmable gate array (FPGA)) and program instructions executable by one or more processing units. For example, in one implementation, at least some portion of the defogging engine, the estimation engine, and the enhancement engine can be defined at the register transfer level (RTL) using a language such as Verilog, VHDL, or other to create a high-level representation of the circuitry. Lower-level representations and actual wiring of the circuitry can be derived from the RTL code and one or more other inputs. Depending on the embodiment, the defogging engine, the estimation engine, and the enhancement engine can be implemented entirely in circuitry, implemented entirely by program instructions executed by one or more processing units, or implemented by a combination of circuitry and executable program instructions.

Next, the enhancement engine generates an enhanced version of the input image based on the defog filter result and the enhancement strength variable (block 1025). The "enhanced version of the input image" can also be referred to herein as the "defogged version of the input image". In one implementation, the enhanced version of the input image is encoded in the RGB color space. In other implementations, the enhanced version of the input image is encoded in any of various other color space formats. Then, the enhanced version of the input image is displayed, stored, sent to a display controller, and/or processed by another image processing image as a representation of a defogged version of the original input image (block 1030). After block 1030, method 1000 ends. It is noted that method 1000 can be performed for an entire image or for any portion of an image.

Referring now to FIG. 11, one implementation of a method 1100 for generating a defog filter result is shown. A first mean of an input image is calculated by a defog filter (e.g., defog filter 412 of FIG. 4) (block 1105). Also, the second mean of the input image is calculated (block 1110). In one implementation, the first and second means of the input image are computed according to the corresponding formulas in box 702 (of FIG. 7). Next, the variance of the input image is calculated as the difference between the second mean and the dot product of the first mean with the first mean (block 1115). In one implementation, the variance of the input image is computed according to the formula in box 702. Next, the "a" variable is calculated as the variance divided by the sum of the variance and a regularization parameter (block 1120). Then, the "b" variable is calculated as the difference between the first mean and the dot product of the "a" variable multiplied by the first mean (block 1125). Next, the "q" variable is calculated as the sum of the "b" variable and the dot product of the "a" variable multiplied by the input image (block 1130). Then, the "q" variable is provided as a defog filter result to an enhancement unit to be used for generating an enhanced, defogged version of the input image (block 1135). After block 1135, method 1100 ends. It is noted that method 1100 can be performed for an entire image or for any portion of an image.

Turning now to FIG. 12, one implementation of a method 1200 for generating an enhanced, defogged version of an input image is shown. A conversion unit (e.g., conversion unit 406 of FIG. 4) converts an input image from the RGB color space to a grayscale format (block 1205). Also, an enhancement unit (e.g., enhancement unit 410) generates a color correction version of the input image (block 1210). It is noted that blocks 1205 and 1210 can be performed in parallel or sequentially in any order. Additionally, a defog filter (e.g., defog filter 412) generates a defog filter result (or "q") from the grayscale format version of the input image (block 1215). Then, the enhancement unit calculates a dot product of an enhancement strength variable (or "ER") multiplied by the difference between the color correction version of the input image and the defog filter result (block 1220). Next, the enhancement unit generates an enhanced image by calculating a sum of the dot product and the defog filter result (block 1225). In one implementation, the enhanced image is calculated in accordance with the formula in box 808 (of FIG. 8). After block 1225, method 1200 ends. It is noted that method 1200 can be performed for an entire image or for any portion of an image.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (EIDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:

defogging circuitry configured to generate a defog filter result from a grayscale version of an input image;

estimation circuitry configured to generate an enhancement strength variable from a hue-saturation-value (HSV) version of the input image; and enhancement circuitry configured to generate an enhanced version of the input image from a red-green-blue (RGB) version of the input image based on the defog filter result and the enhancement strength variable.

2. The apparatus as recited in claim 1, wherein the enhancement circuitry is configured to concurrently receive the defog filter result and the enhancement strength variable as separate inputs.

3. The apparatus as recited in claim 1, further comprising conversion circuitry configured to convert the input image to the grayscale version and to HSV version.

4. The apparatus as recited in claim 1, wherein the enhancement circuitry is further configured to generate the enhanced version of the input image from the RGB version of the input image based on the defog filter result, the enhancement strength variable, and a color correction version of the input image.

5. The apparatus as recited in claim 1, wherein the enhancement circuitry is further configured to generate the enhanced version of the input image from the RGB version of the input image based at least in part on a difference between a color correction version of the input image and the defog filter result.

6. The apparatus as recited in claim 1, wherein wherein the enhanced version of the input image is encoded in the RGB version.

7. The apparatus as recited in claim 1, wherein the enhancement circuitry is configured to generate the enhanced version of the input image based on a combination of the defog filter result, the enhancement strength variable, and a difference between a color-corrected version of the input image and the defog filter result.

8. A method comprising:

generating, by a defogging engine, a defog filter result from a grayscale version of an input image;

generating, by an estimation engine, an enhancement strength variable from a hue-saturation-value (HSV) version of the input image;

generating, by an enhancement engine, an enhanced version of the input image from a red-green-blue (RGB) version of the input image based on the defog filter result and the enhancement strength variable.

9. The method as recited in claim 8, wherein the enhancement engine concurrently receives the defog filter result and the enhancement strength variable as separate inputs.

10. The method as recited in claim 8, further comprising generating a color correction version of the input image.

11. The method as recited in claim 10, further comprising generating the enhanced version of the input image from the RGB version of the input image based on the defog filter result, the enhancement strength variable, and the color correction version of the input image.

12. The method as recited in claim 8, further comprising generating the enhanced version of the input image from the RGB version of the input image based at least in part on a difference between a color correction version of the input image and the defog filter result.

13. The method as recited in claim 8, wherein each of the defogging engine, estimation engine, and enhancement engine comprises one or more of: an application-specific integrated circuit (ASIC), a field-programmable gate array (FPGA), or one or more processing units configured to execute program instructions stored in memory.

14. The method as recited in claim 8, further comprising generating the enhanced version of the input image based on a combination of the defog filter result, the enhancement strength variable, and a difference between a color-corrected version of the input image and the defog filter result.

15. A system comprising:

conversion circuitry configured to convert a grayscale version of an input image to a hue-saturation-value (HSV) version of the input image; and processing circuitry configured to:

generate a defog filter result from the grayscale version of the input image;

generate an enhancement strength variable from the HSV version of the input image; and generate an enhanced version of the input image from a red-green-blue (RGB) version of the input image based on the defog filter result and the enhancement strength variable.

16. The system as recited in claim 15, wherein the processing circuitry is configured to concurrently process the defog filter result and the enhancement strength variable as separate inputs.

17. The system as recited in claim 15, wherein the processing circuitry is further configured to generate a color correction version of the input image.

18. The system as recited in claim 15, wherein the processing circuitry comprises one or more of: an application-specific integrated circuit (ASIC), a field-programmable gate array (FPGA), or one or more processing units configured to execute program instructions stored in memory.

19. The system as recited in claim 17, wherein the processing circuitry is further configured to generate the enhanced version of the input image from the RGB version of the input image based at least in part on a difference between the color correction version of the input image and the defog filter result.

20. The system as recited in claim 15, wherein the processing circuitry is further configured to generate the enhanced version of the input image based on a combination of the defog filter result, the enhancement strength variable, and a difference between a color-corrected version of the input image and the defog filter result.

* * * * *